United States Patent
Xiao et al.

(10) Patent No.: US 11,936,928 B2
(45) Date of Patent: Mar. 19, 2024

(54) METHOD, SYSTEM AND DEVICE FOR SHARING CONTENTS

(71) Applicant: SAMSUNG ELECTRONICS CO., LTD., Suwon-si (KR)

(72) Inventors: Peng Xiao, Nanjing (CN); Haoliang Zhu, Nanjing (CN); Zhi Zhou, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 16/952,313

(22) Filed: Nov. 19, 2020

(65) Prior Publication Data

US 2021/0152857 A1    May 20, 2021

(30) Foreign Application Priority Data

Nov. 19, 2019    (CN) .......................... 201911133319.0

(51) Int. Cl.
*H04N 21/238*    (2011.01)
*G06F 9/451*    (2018.01)
(Continued)

(52) U.S. Cl.
CPC .......... *H04N 21/238* (2013.01); *G06F 9/452* (2018.02); *G06F 9/45558* (2013.01); *G06F 9/547* (2013.01); *G06F 2009/45595* (2013.01)

(58) Field of Classification Search
CPC ... H04N 21/238; G06F 9/452; G06F 9/45558; G06F 9/547; G06F 2009/45595
See application file for complete search history.

(56) References Cited

U.S. PATENT DOCUMENTS 8,683,496 B2 *  3/2014  Reeves ................ H04L 67/131
                                                    719/319
9,081,601 B2     7/2015  Tang
(Continued)

FOREIGN PATENT DOCUMENTS

CN    102685572 A    9/2012
CN    102752369 A    10/2012
(Continued)

OTHER PUBLICATIONS

Communication dated May 18, 2021 issued by the Intellectual Property Office of the P.R. China in application No. 201911133319.0.

(Continued)

*Primary Examiner* — James R Sheleheda
(74) *Attorney, Agent, or Firm* — Sughrue Mion, PLLC

(57) ABSTRACT

An electronic device, including a memory configured to store at least one instruction; and at least one processor which is, by executing the at least one instruction, configured to: set, at the electronic device, a virtualized container including at least one application installed in the electronic device; execute, at the electronic device, an application on the virtualized container; transmit, from the electronic device, content corresponding to the application to a client of the virtualized container; receive, at the electronic device, a control instruction from the client of the virtualized container; and control, at the electronic device, the application according to the received control instruction.

6 Claims, 11 Drawing Sheets

(51) Int. Cl.
  *G06F 9/455* (2018.01)
  *G06F 9/54* (2006.01)

(56) References Cited

U.S. PATENT DOCUMENTS

| | | | |
|---|---|---|---|
| 9,329,762 | B1 | 5/2016 | Schultz et al. |
| 9,451,043 | B2* | 9/2016 | Zhao ................... H04L 67/59 |
| 11,036,367 | B2* | 6/2021 | Kim ................... H04L 67/125 |
| 2010/0146504 | A1 | 6/2010 | Tang |
| 2012/0084798 | A1* | 4/2012 | Reeves ................ H04L 67/131 |
| | | | 719/319 |
| 2014/0026068 | A1 | 1/2014 | Park et al. |
| 2014/0344332 | A1* | 11/2014 | Giebler ................ H04L 67/565 |
| | | | 709/203 |
| 2015/0046599 | A1* | 2/2015 | Ulanov ................ H04L 67/131 |
| | | | 709/230 |
| 2015/0081764 | A1* | 3/2015 | Zhao ................... G06F 9/452 |
| | | | 709/203 |
| 2016/0080549 | A1 | 3/2016 | Yuan et al. |
| 2016/0087836 | A1* | 3/2016 | Abramson ............ H04L 65/403 |
| | | | 709/223 |
| 2016/0364200 | A1* | 12/2016 | Beveridge .............. H04L 67/56 |
| 2018/0077442 | A1* | 3/2018 | Herz ................. H04N 21/41407 |
| 2018/0077449 | A1* | 3/2018 | Herz ...................... H04L 67/12 |
| 2018/0227347 | A1 | 8/2018 | Rombakh et al. |
| 2018/0241609 | A1 | 8/2018 | Rombakh et al. |
| 2019/0011997 | A1 | 1/2019 | Wisnia et al. |
| 2019/0018719 | A1* | 1/2019 | Brin ..................... H04W 12/08 |
| 2019/0050242 | A1 | 2/2019 | Raffaele et al. |
| 2019/0260966 | A1 | 8/2019 | Leatherman, III |
| 2019/0278623 | A1* | 9/2019 | Kirisken ............. G06F 9/45558 |
| 2019/0342400 | A1* | 11/2019 | Van Rotterdam ..... G06F 9/4856 |
| 2020/0042268 | A1* | 2/2020 | Kim ....................... G06F 3/038 |
| 2022/0156029 | A1* | 5/2022 | Lee ......................... G09G 5/003 |

FOREIGN PATENT DOCUMENTS

| | | |
|---|---|---|
| CN | 104391581 A | 3/2015 |
| CN | 106658103 A | 5/2017 |
| CN | 109889885 A | 6/2019 |
| CN | 111796909 A * | 10/2020 |

OTHER PUBLICATIONS

Communication dated Sep. 15, 2021 issued by the State Intellectual Property Office of P.R. China in counterpart Chinese application No. 201911133319.0.

"NVIDIA Gamesteam", ttps://support-shield.nvidia.com/gamestream-userguide/#t=NVIDIA_GameStream.htm, Retrieved Nov. 19, 2020, Total 1 page.

International Search Report (PCT/ISA/210) and Written Opinion (PCT/ISA/237) issued by the International Searching Authority in International Application No. PCT/KR2020/016386, dated Feb. 22, 2021.

* cited by examiner

METHOD, SYSTEM AND DEVICE FOR SHARING CONTENTS

CROSS-REFERENCE TO THE RELATED APPLICATION(S)

This application is based on and claims priority under 35 U.S.C. § 119 to Chinese Patent Application No. 201911133319.0, filed on Nov. 19, 2019, in the State Intellectual Property Office of P.R. China, the disclosure of which is incorporated by reference herein in its entirety.

BACKGROUND

1. Field

The disclosure relates to computer technologies, and more particularly, to a method, a system and a device for sharing contents between electronic devices.

2. Description of Related Art

With developments of computer and Internet technologies, functions of smart devices, such as smart televisions (TVs) and smart phones, are becoming more popular and powerful. For example, screen contents of a smart phone may be displayed on a smart TV. Compared with a smart terminal, a smart media device, such as a smart TV, possesses the advantages of a larger screen and better viewing experience. While compared with a smart media device, a smart terminal possesses the advantages of portability, more complete application (APP) ecosystem, powerful Central Processing Unit (CPU), Graphics Processing Unit (GPU) and memory. Audio and video contents may be shared in a smart terminal with a smart media device, thereby sharing contents among smart devices.

At present, Miracast technology, mirror technology provided by Digital Living Network Alliance (DLNA), and various custom technologies derived from these technologies are used to share contents among smart devices.

SUMMARY

Provided are a method, an apparatus, an electronic device, and a computer readable storage medium for translating voice.

In accordance with an aspect of the disclosure, an electronic device includes a memory configured to store at least one instruction; and at least one processor which is, by executing the at least one instruction, configured to: set, at the electronic device, a virtualized container including at least one application installed in the electronic device; execute, at the electronic device, an application on the virtualized container; transmit, from the electronic device, content corresponding to the application to a client of the virtualized container; receive, at the electronic device, a control instruction from the client of the virtualized container; and control, at the electronic device, the application according to the received control instruction.

The application may be executed in a background of the electronic device.

The virtualized container may be executed in a background of the electronic device.

The at least one processor may be further configured to display a homescreen including a plurality of graphical representations corresponding to a plurality of applications installed in the electronic device while the application is executed on the virtualized container, the content is played at the client of the virtualized container, and the application is controlled by the control instruction received from the client of the virtualized container.

The at least one processor may be further configured to: display an execution screen of the application on a display of the electronic device; and in response to receiving a user input to exit the application, display a homescreen on the display, and run the application in a background of the electronic device while the content is played at the client of the virtualized container, and the application is controlled by the control instruction received from the client of the virtualized container The at least one processor may be further configured to execute and display another application which is not included in the at least one application of the virtualized container while the application is executed on the virtualized container, the content is played at the client of the virtualized container, and the application is controlled by the control instruction received from the client of the virtualized container.

The at least one processor may be further configured to: generate a series of screenshots of the application; encode the series of screenshots using a video codec to generate a video stream; and transmit the video stream to the client of the virtualized container.

The at least one processor may be further configured to: record audio of the application to generate an audio stream; and transmit the audio stream to the client of the virtualized container.

The virtualized container may be supported by a virtual desktop infrastructure (VDI) server and a remote procedure call (RPC) server running on the electronic device, and the VDI server may be configured to transmit the to the client of the virtualized container, and the RPC server may be configured to receive the control instruction from the client of the virtualized container.

The client may be a first client, the at least one application may be at least one first application, the application may be a first application, the control instruction may be a first control instruction, the content may be first content, and the at least one processor may be further configured to: set, at the electronic device, a second virtualized container including at least one second application installed in the electronic device; execute, at the electronic device, a second application on the second virtualized container; transmit, from the electronic device, second content corresponding to the second application to a second client of the second virtualized container; receive, at the electronic device, a second control instruction from the second client of the second virtualized container; and control, at the electronic device, the second application according to the received second control instruction.

In accordance with an aspect of the disclosure, electronic device includes a memory configured to store at least one instruction; and at least one processor which is, by executing the at least one instruction, configured to: set the electronic device as a client of a virtualized container, the virtualized container being set on a host of the virtualized container and including at least one application installed in the host of the virtualized container; receive, at the electronic device, content corresponding to an application executed on the virtualized container of the host; play the content; and based on receiving, at the electronic device, a user interaction for controlling the application, transmitting a control instruction to the host of the virtualized container.

The at least one processor may be further configured to detect the host of the virtualized container on a network to which the electronic device is connected.

The electronic device and the host of the virtualized container may be associated with a same account.

The at least one processor may be further configured to display, on a display of the electronic device, at least one graphical representation corresponding to the at least one application installed in the host of the virtualized container, and the application may be executed on the virtualized container of the host in response to receiving, at the electronic device, a selection of a graphical representation corresponding to the application.

The at least one processor may be further configured to: receive a video stream from the host of the virtualized container; and decode the video stream to play the content corresponding to the application.

The electronic device of may further include a remote control, wherein the user interaction is received through the remote control.

The client of the virtualized container may be supported by a virtual desktop infrastructure (VDI) client and a remote procedure call (RPC) client running on the electronic device, and the VDI client may be configured to receive the content from the host of the virtualized container, and the RPC client may be configured to transmit the control instruction to the host of the virtualized container.

The client may be a first client, the host may be a first host, the at least one application may be at least one first application, the application may be a first application, the virtualized container may be a first virtualized container, the control instruction may be a first control instruction, and the at least one processor may be further configured to: set the electronic device as a second client of a second virtualized container, the second virtualized container being set on a second host of the second virtualized container and including at least one second application installed in the second host of the second virtualized container; display two graphical representations corresponding to the first host of the first virtualized container and the second host of the second virtualized container; and display a plurality of graphical representations corresponding to the at least one first application and the at least one second application.

In accordance with an aspect of the disclosure, a method performed at an electronic device includes setting, on the electronic device, a virtualized container including at least one application installed in the electronic device; executing, at the electronic device, an application on the virtualized container; transmitting, from the electronic device, content corresponding to the application to a client of the virtualized container; receiving, at the electronic device, a control instruction from the client of the virtualized container; and controlling, at the electronic device, the application according to the received control instruction.

In accordance with an aspect of the disclosure, a non-transitory computer-readable medium has instructions recorded thereon which, when executed by at least one processor, cause the at least one processor to execute methods disclosed herein.

Embodiments of the disclosure may relate to setting a virtualized container in a smart terminal, installing multiple APPs in the virtualized container; setting a client of the virtualized container in a smart media device; running, by the smart terminal, an APP in the virtualized container, transmitting contents of the APP to the client of the virtualized container in the smart media device; playing, by the smart media device, the contents; performing, by the smart media device, a control interaction with the virtualized container of the smart terminal through the client of the virtualized container. Subsequently, when sharing contents among smart devices, it may not be necessary for the front end of the smart terminal to run the shared contents, and the smart media device therein may be enabled to manipulate the shared contents, thereby improving privacy for sharing contents.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1A:
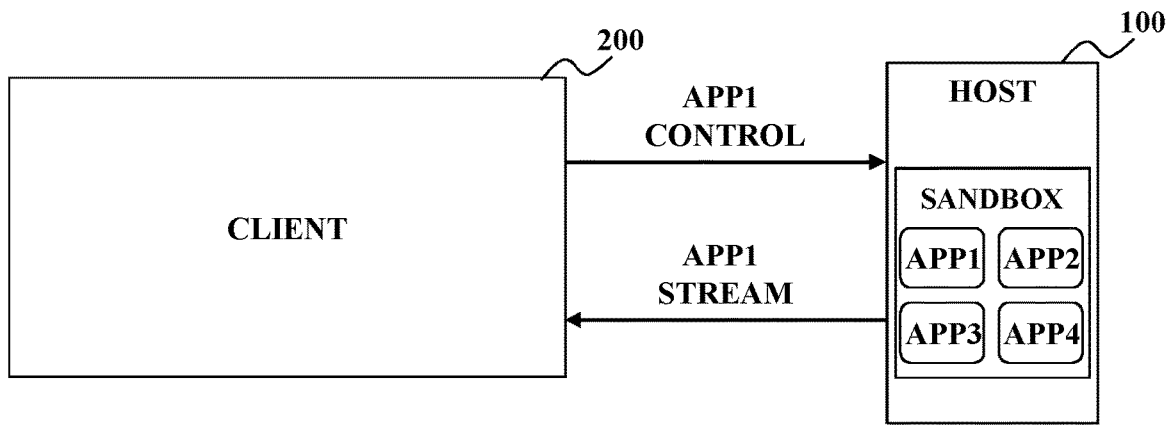
FIG. 1A is a schematic diagram illustrating a host and a client of a virtualized container according to an embodiment.

Various example embodiments will now be described in greater detail below with reference to the accompanying drawings. However, the inventive concept may have different forms and should not be understood as being limited to the embodiments set forth herein. Parts not related to the embodiments may be omitted for clarity. Throughout the drawings, it should be noted that like reference numbers are used to depict the same or similar elements, features, and structures.

The terms and words used in the following description and claims are not limited to the bibliographical meanings, but are merely used to enable a clear and consistent understanding of the embodiments. Accordingly, it should be apparent to those skilled in the art that the following description of various embodiments is provided for illustration purpose only and not for the purpose of limiting the inventive concept as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

Herein, the terms, such as " . . . unit" or " . . . module" may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an embodiment of the disclosure.

Expressions, such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

At present, Miracast technology, mirror technology provided by Digital Living Network Alliance (DLNA), and various custom technologies derived from these technologies are used to share contents among smart devices. However, these technologies for sharing contents may have deficiencies, examples of which will be described below.

When adopting Miracast technology to share contents by a smart device, contents of a captured screen of the smart terminal may be projected onto a smart media device, and the smart media device is only used as a monitor, which may have the following disadvantages:

When sharing contents, the smart terminal is in an exclusive state, and a user cannot do other work;

The shared contents may be contents of current screen of the smart terminal, at this time, if there is a message, or a phone access displayed on current screen of the smart terminal, the message or phone access may be displayed simultaneously on the smart media device causing poor privacy;

When sharing contents, the user's perspective is on the smart media device, and it is more reasonable for the user to manipulate the smart media device; however, at this time, the smart media device is only used as a monitor without the capability of manipulating contents.

When adopting the DLNA technology, an APP set in a smart terminal transmits a video link to a smart media device, and the smart media device simply plays video contents, which may have the following disadvantages:

The APP set in the smart terminal needs to support the DLNA protocol, however, many non-video APPs at present do not support the DLNA protocol, such as Office or Keep, and so on, for contents of these APPs not supporting the DLNA protocol, sharing between the smart terminal and the smart media device cannot be achieved;

When the smart media device shares and plays contents via the DLNA, the smart media device cannot manipulate contents running on the smart terminal, e.g., cannot exit current video contents to play next video contents, and so on.

In view of above, when sharing contents among smart devices, deficiencies may be present, such as poor privacy, a need for the front end of the smart terminal to run the shared contents, and an inability of the smart media device to manipulate the shared contents, such that user experience is not desirable.

When a traditional smart device shares contents with another device such as a smart television (TV), the shared contents may need to be run at a foreground of the device, and subsequently the sharing of the contents may result in lost privacy, and the smart media device cannot control the shared contents. In embodiments, a smart device or smart terminal may be a smartphone, but is not limited thereto. In embodiments, a smart device may be a tablet, a laptop, a smart watch, a smart glass, a head mounted display, etc. The smart device may be referred to as a first device. The smart device may be referred to as a host of a virtualized container. In embodiments, the smart media device may be a smart TV, a smart projector, a set top box, a TV box, a head mounted display, etc. The smart media device may be referred to as a second device. The smart media device may be referred to as a client of a virtualized container. To protect privacy, in embodiments of the disclosure, a virtualized container may be set in the smart terminal, in which multiple APPs are installed; a client of the virtualized container may be set in the smart media device; the smart terminal may run an APP in the virtualized container, transmit contents of the APP to the client of the virtualized container in the smart media device; the smart media device may play the contents; the smart media device may perform a control interaction with the virtualized container of the smart terminal via the client of the virtualized container. Thus, when sharing contents among smart devices, the foreground of the smart terminal may not be used to run, play, or display the shared contents, and the smart media device may be enabled to play and used for a user to interact with the shared contents, thereby improving privacy when sharing contents.

FIG. 1A is a schematic diagram illustrating a host and a client of a virtualized container according to an embodiment.

The smart terminal 100 may provide a virtualized container service for the smart media device 200. In embodiments, the virtualized container service may be referred to as a sandbox service. The virtualized container set may be actually a server end of the virtualized container. In embodiments, the virtualized container may be referred to as a sandbox. The virtualized container may be a lightweight and runnable virtual machine, which is installed in the smart terminal 100. The virtualized container may load a root file directory (rootfs) of the Operating System (OS) such as Android OS, but is not limited thereto, in the smart terminal 100, and may be embodied in the form of an APP in the smart terminal 100. Various types of APPs, such as APP1, APP2, APP3, and APP4 needed by a user may be installed on the virtualized container to provide virtualized container service. Subsequently, the virtualized container may share APP-related contents with the smart media device 200. For example, APP1 stream may be transmitted from the smart terminal 100 to the smart media device 200. The virtualized container service may be an APP in the smart terminal 100, and the APP may be running in the background of the smart terminal 100. Therefore, even when providing the virtualized container service, the smart terminal 100 may also run other APPs on its foreground or background. In embodiments of the disclosure, the client of the virtualized container set in the smart media device 200 may perform a function of device discovery. As a result of performing the device discovery function, smart terminals 100 in the same Local Area Network (LAN) may be discovered by the smart media device 200. After a connection between the smart media device 200 and the smart terminal 100 is established through the virtualized container service, when the virtualized container is running in the background of the smart terminal 100, the smart terminal 100 only shares contents, which are related to an APP running in the virtualized container, with the client of the virtualized container in the smart media device 200, instead of sharing contents related with an APP running in the front end of the smart terminal 100, or contents of User Interface (UI) of the smart terminal 100, such that the user privacy may be protected. In an embodiment, APP1 may be controlled via the smart media device 200, such as its remote control.

Figure 1B:
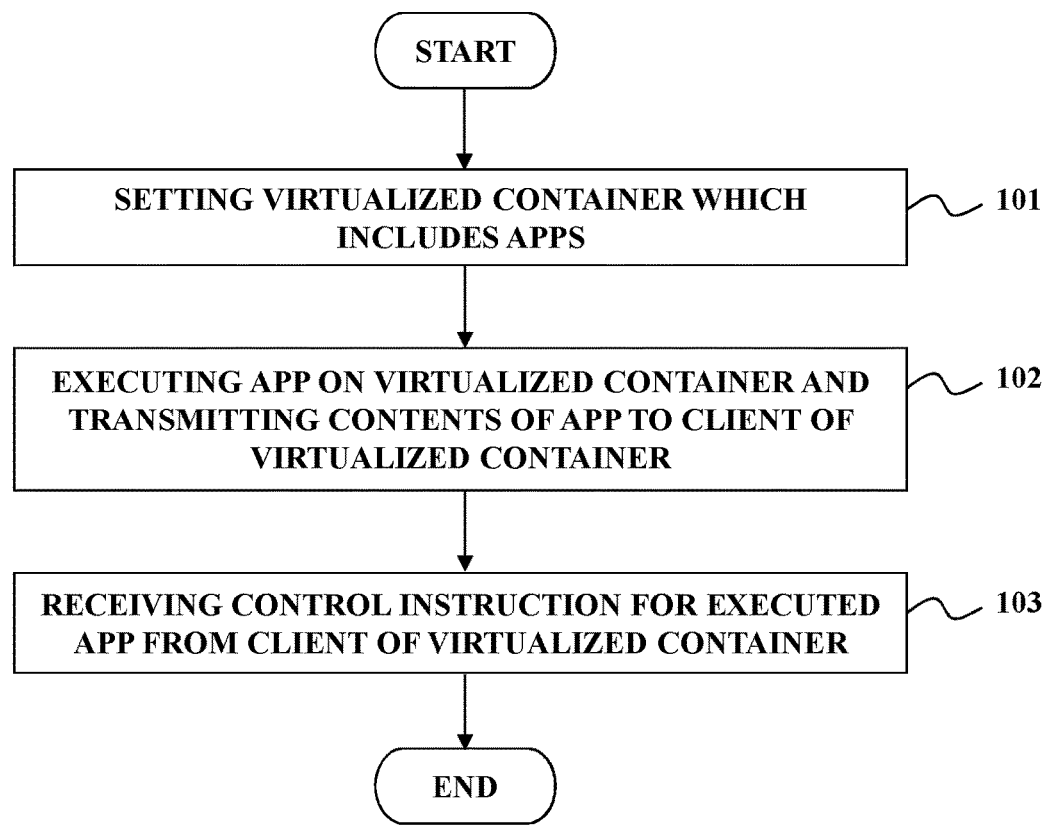
FIG. 1B is a flowchart illustrating a method for transmitting according to an embodiment.

FIG. 1B is a flowchart illustrating a method for transmitting contents in accordance with an embodiment of the disclosure.

The method for transmitting contents may be performed by a smart terminal, but is not limited thereto. In Operation 101, the smart terminal may set a virtualized container which includes a plurality of APPs. The APPs may be installed in the virtualized container.

In Operation 102, the smart terminal may run an APP on the virtualized container, and transmit contents of the APP to a client of the virtualized container. In an embodiment, the client of the virtualized container may be set by a smart media device. The smart media device may receive and play the contents of the APP. In an embodiment, the APP may be run on the virtualized container in response to a request from the smart media device, an example of which will be explained later with reference to FIG. 14.

In Operation 103, the virtualized container in the smart terminal may receive a control instruction from the client of the virtualized container. In an embodiment, in response to a user interaction with a remote control of the smart media device, a control instruction may be generated and transmitted to the host of the virtualized container.

Setting the virtualized container in the smart terminal may be supported by: virtualized container setup function, Virtual Desktop Infrastructure (VDI) service function, Remote Procedure Call (RPC) service function, In an embodiment, the virtualized container setup function may be configured to set the virtualized container in the smart terminal.

In an embodiment, the VDI server function may be configured to transmit contents of an APP, which is running in the virtualized container, to the smart media device. An example of the VDI service function will be explained later with reference to FIGS. 11 and 12.

In an embodiment, the RPC server function may be configured to receive the control instruction, and perform a corresponding interaction with the APP.

In an embodiment, a plurality of virtualized containers may be set on one smart terminal or a plurality of smart terminals. Each virtualized container may be used to interact with a client of each virtualized container. The virtualized containers may respectively transmit contents of an APP, which is running in each virtualized container, to each client of each virtualized container, such that each client plays and control each APP executed on each virtualized container.

In an embodiment, setting the virtualized container in the smart terminal may be completed, under the control of the control instruction, which is transmitted by the client of the virtualized container set by the smart media device. In an embodiment, the client of the virtualized container of the smart media device may discover the smart terminals in the same LAN, by using possessed function of device discovery, an example of which will be explained later with reference to FIG. 14.

In the method, the virtualized container may be set for various types of mobile OSs in the smart terminal, such as Android OS, Tyzen OS, or Apple OS. The smart terminal may be a mobile phone, or a tablet computer, and so on, or even a smart TV.

Figure 2:
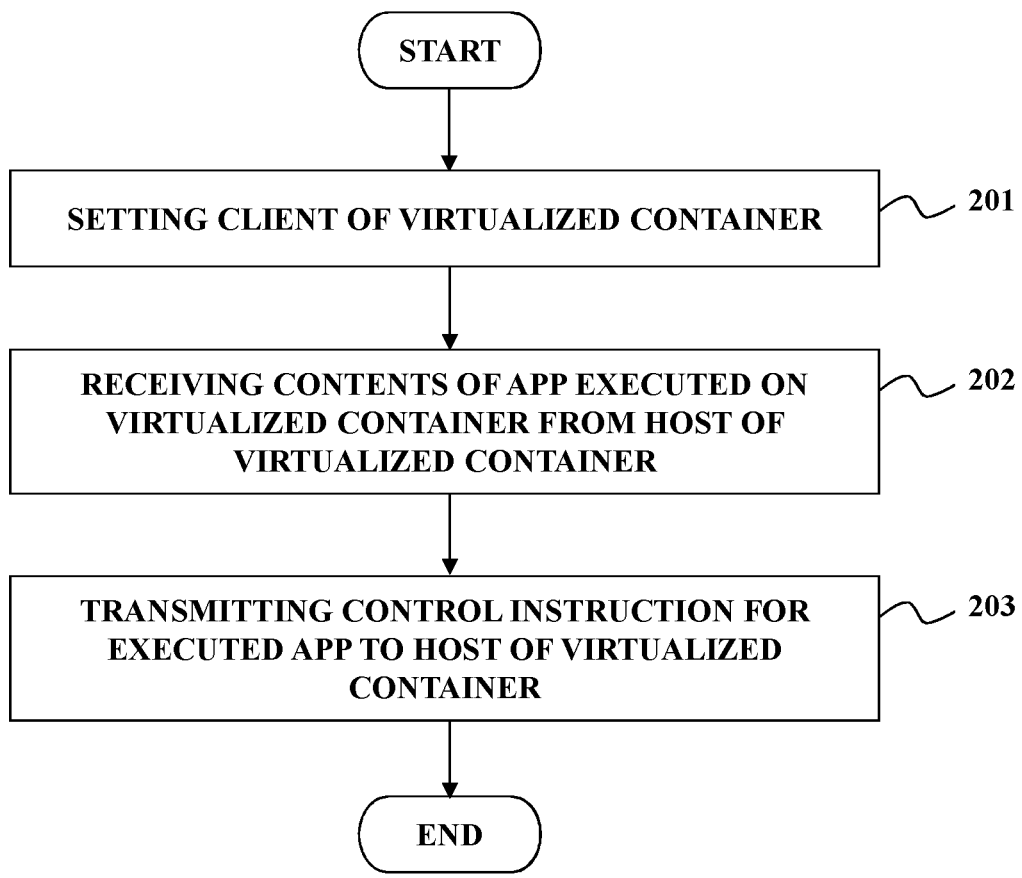
FIG. 2 is a flowchart illustrating a method for receiving contents according to an embodiment.

FIG. 2 is a flowchart illustrating a method for receiving contents in accordance with an embodiment of the disclosure.

The method for receiving contents may be performed by a media device such as a television (TV), but is not limited thereto.

In Operation 201, a smart media device may be set as a client of a virtualized container. In an embodiment, the smart media device may set itself as the client of the virtualized container, but is not limited thereto. The smart media device may be set as the client of the virtualized container by a host of the virtualized container.

In Operation 202, the client of the virtualized container in the smart media device may receive contents of an APP, which is running in the virtualized container of a smart terminal, and play the contents.

In Operation 203, the client of the virtualized container in the smart media device may transmit a control instruction of the contents.

In an embodiment, the client of the virtualized container may have a function of device discovery, a VDI client function, and a RPC client function.

In an embodiment, the function of device discovery may be configured to discover a smart terminal with a virtualized container in the same network, such as LAN. An account may be used to connect the smart terminal and the smart media device.

In an embodiment, the VDI client function may enable the client of the virtualized container in the smart media device to receive and play the contents.

In an embodiment, the RPC client function may enable the smart media device to transmit the control instruction of the contents.

In an embodiment, the control instruction of the contents may be encoded and transmitted to the smart terminal via a control channel established with the smart terminal.

In an embodiment, the control instruction of the contents may be obtained by the smart media device, based on identifying a button-press event of a remote control of the smart media device, or is directly generated by the smart media device.

In an embodiment, the client of the virtualized container may be set for various types of OSs of the smart media device, such as the Android OS, Tyzen OS, or Apple OS, and so on. The smart media device may be a mobile phone, a tablet computer or a smart TV.

Figure 3:
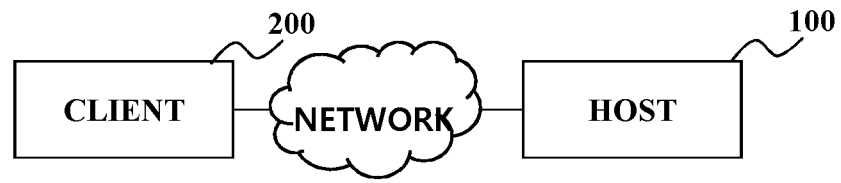
FIG. 3 is a schematic diagram illustrating structure of a system for sharing contents according to an embodiment.

FIG. 3 is a schematic diagram illustrating structure of a system for sharing contents in accordance with an embodiment of the disclosure.

The system may include a smart media device 200 and a smart terminal 100.

The smart terminal 100 may be configured to set a virtualized container, in which APPs are installed on the virtualized container. The smart terminal 100 may run an APP on the virtualized container, transmit contents of the APP to a client of the virtualized container. The virtualized container may receive a control instruction from the client of the virtualized container in the smart media device 200, and performs a control operation according to the received control instruction.

The smart media device 200 may be set as the client of the virtualized container. The client smart media device 200 of the virtualized container may receive and play the contents of the APP, which is running in the virtualized container of the smart terminal 100, and the client smart media device 200 of the virtualized container may transmit the control instruction of the contents.

Figure 4:
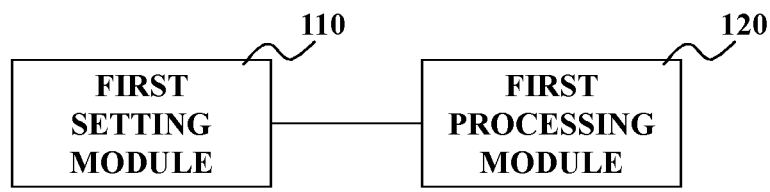
FIG. 4 is a schematic diagram illustrating structure of a host for sharing contents according to an embodiment.

FIG. 4 is a schematic diagram illustrating structure of a host for sharing contents in accordance with an embodiment of the disclosure.

The host may be a first device, and may be for example a smart terminal 100, and may include a first setting module 110 and a first processing module 120.

The first setting module 110 may be configured to set a virtualized container including APPs. The APPs may be installed on the virtualized container;

The first processing module 120 may be configured to run an APP in the virtualized container, transmit contents of the APP to a client of the virtualized container set by a smart media device; in which the virtualized container receives a control instruction from the client of the virtualized container in the smart media device, and performs a control operation.

Figure 5:
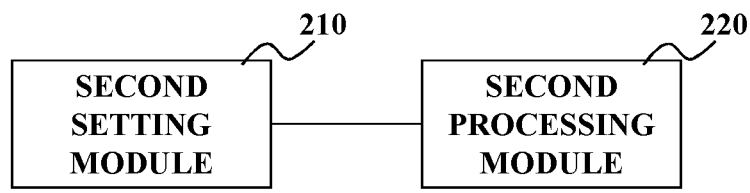
FIG. 5 is a schematic diagram illustrating structure of a client for sharing contents according to an embodiment.

FIG. 5 is a schematic diagram illustrating structure of a client for sharing contents in accordance with an embodiment of the disclosure.

The client may be a second device, and may be for example a smart media device 200, and may include a second setting module 210 and a second processing module 220.

The second setting module 210 may be configured to set a client of a virtualized container.

The second processing module 220 may be configured to enable the client of the virtualized container to receive and play contents of an APP, which is running in the virtualized container of a smart terminal, in which the client of the virtualized container transmits a control instruction of the contents.

In embodiment of the disclosure, the smart terminal 100 may be a mobile phone, and the smart media device 200 may be a TV. Detailed descriptions will be provided in the following by using an example, in which a mobile phone and a TV are used.

Detailed descriptions about embodiments in the disclosure will be provided in the following.

A virtualized container may be set in a mobile phone, and a virtualized container service is provided.

The virtualized container provided by the mobile phone may be a server end of the virtualized container, which may possess the following three functions:

a virtualized container setup function, which is a virtual OS running on the mobile phone, is capable of independently and completely providing a series of operation services, such as downloading, installing, running, exiting, and/or, deleting various types of APPs;

a VDI server function completes retrieval of contents related with a shared APP in the virtualized container, such as retrieval of audio and video contents of shared contents, and transmit to a TV by using a network streaming protocol, and then, the TV takes charge of rendering and playing the contents based on the APP;

an RPC server function is in charge of processing a control instruction received from the TV, applying the control instruction to a corresponding APP loaded by the virtualized container, and performing a control operation.

In the example above, sharing and controlling contents by the virtualization container in the mobile phone may be completed by the following functions:

a smart terminal discovery function, configured to enable the TV to discover a mobile phone with the virtualized container in the same LAN, or in the same network;

a VDI client function, configured to receive APP related contents from the mobile phone, render and play the APP related contents in the media, specifically, take charge of receiving and playing audio and video contents from the mobile phone, synchronizing the audio and video contents during playback; and, an RPC client function, configured to transmit the control instruction to the mobile phone. The control instruction may be directly transmitted by the TV, or may be generated after identifying a button-press event of a remote control of the TV, which is not limited here.

Figure 6:
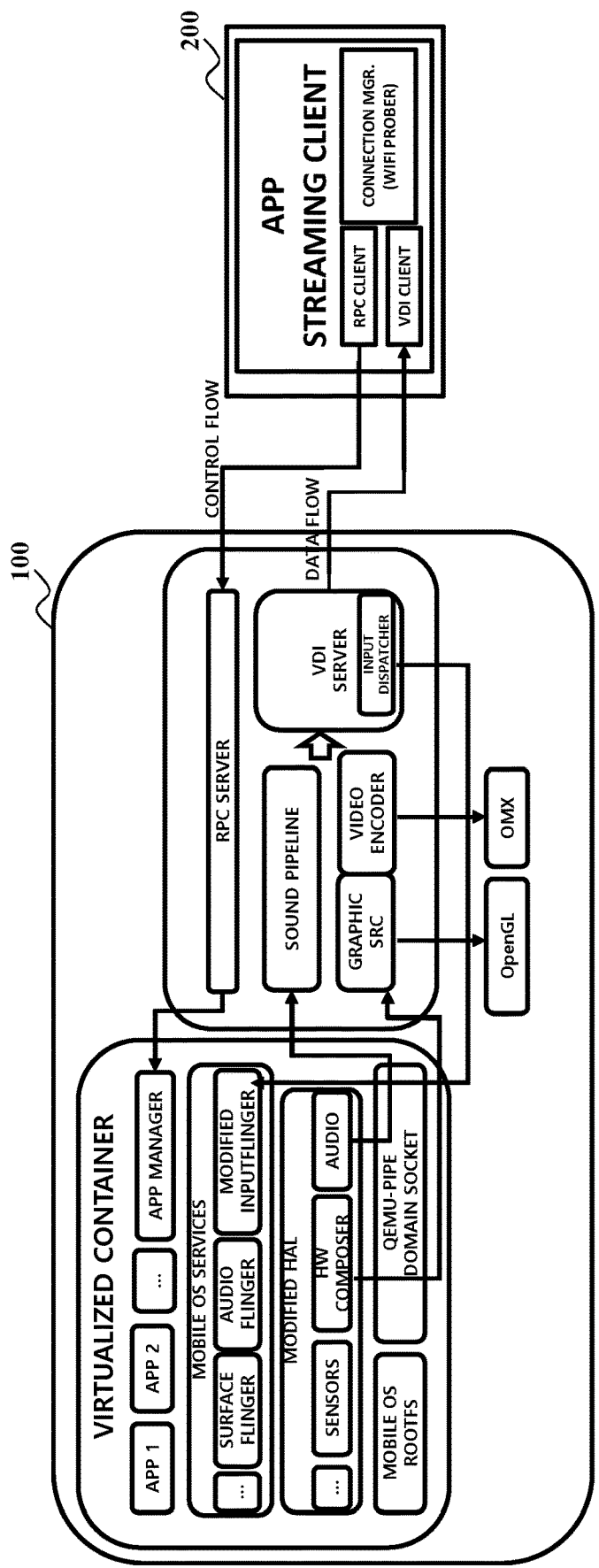
FIG. 6 is a schematic diagram illustrating structure of a system including a host and a client of a virtualized container according to an embodiment.

FIG. 6 is a schematic diagram illustrating structure of a system including a host and a client of a virtualized container in accordance with an embodiment of the disclosure.

In the example, a smart media device 200 is a TV, and a smart terminal 100 is a mobile phone.

From the perspective of the smart media device 200, an example flow for the smart media device 200 to control the smart terminal 100 and complete interactions is as follows.

In an embodiment, the smart media device 200 and the smart terminal 100 may access the same Local Area Network (LAN). When a multi device environment (MDE) service is initiated, the smart media device 200 may monitor the network and detect the smart terminal 100 with a virtualized container accessing the same LAN. The smart media device 200 may transmit a control message for setting the virtualized container to the smart terminal 100 when the smart media device 200 has detected the smart terminal 100.

When the smart terminal 100 has set the virtualized container, the smart media device 200 may transmit a load request to the smart terminal 100, by using an RPC client function. after the smart terminal 100 receiving the request, the RPC server function of the virtualized container set by the smart terminal 100 may control the virtualized container to run the requested APP.

When the requested APP is loaded through the virtualized container set by the smart terminal 100, the VDI server function of the virtualized container set by the smart terminal 100 may start to work synchronously, and transmit APP-related contents, such as audio and video contents, to the smart media device 200.

When the smart media device 200 obtaining the APP-related contents by the VDI client function of the virtualized container in the smart media device 200, the APP-related contents may be played on the smart media device 200.

Here, the VDI client function of the virtualized container in the smart media device 200 may also identify a button-press event, which is triggered by a remote control of the smart media device 200, to generate a control instruction and transmit the control instruction to the smart media device 200, which may be for example a mobile phone. The VDI server function of the virtualized container in the smart terminal 100 may process the control instruction, map the control instruction to a system button-press event, such that the smart media device 200 may have control over contents related with the APP running in the virtualized container.

From the perspective of the smart terminal 100, an example flow for the smart media device 200 to control the smart terminal 100 and complete interactions is as follows.

In an embodiment, the smart terminal 100 may set the virtualized container, and provide a virtualized container service to a client of the virtualized container. The virtualized container service may be a virtual OS running on the smart terminal 100, which may be an APP, and may be running on a background of the smart terminal 100.

When the smart terminal 100 runs the virtualized container, the smart media device 200 may interact with an RPC server end of the virtualized container in the smart terminal 100, by using an RPC client in the virtualized container, and may perform various operations in the virtualized container, such as initiating downloading, installing, running, exiting, and/or, deleting a certain APP.

The mobile phone may run a certain APP in the virtualized container. The VDI server end of the virtualized container in the smart terminal 100 may start to work synchronously, and provide APP-related contents to the smart media device 200. The VDI server end of the virtualized container in the smart terminal 100 may encode, compress audio and video contents, and transmit them to the smart media device 200 by using a network streaming protocol, and a timestamp may be respectively added to an audio stream and a video stream, such that the audio and video contents may be synchronized during playback of the smart media device 200.

Figure 7:
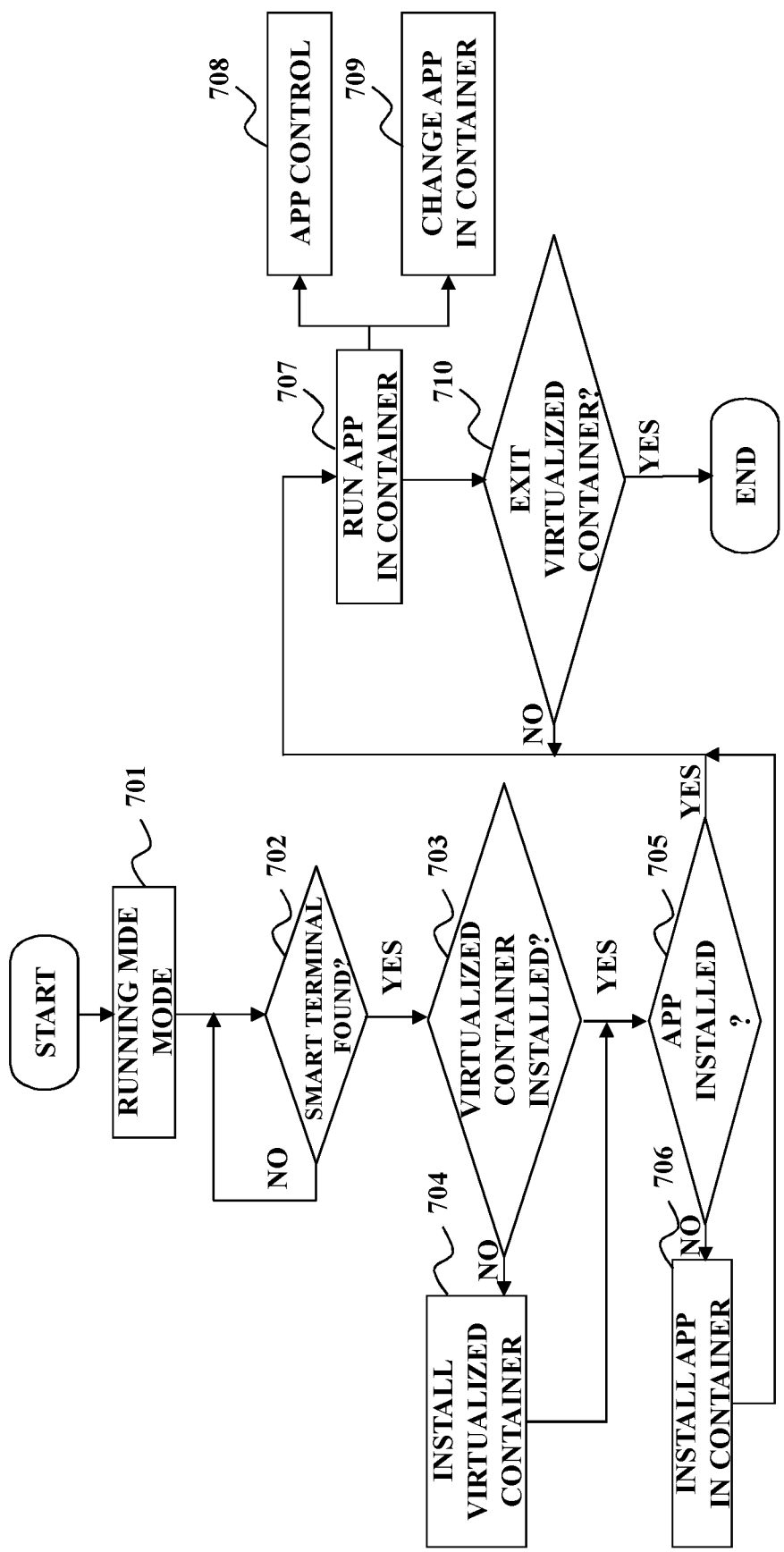
FIG. 7 is a flowchart of a method according to an embodiment.

An example of the above process is shown in FIG. 7.

FIG. 7 is a flowchart of a method in accordance with an embodiment of the disclosure.

It can be seen that, the whole flow may be controlled and completed by a TV end, including streaming server installation, APP installation, APP playback, APP control, APP uninstallation, without the need for mobile phone users to participate.

In Operation 701, a multi device environment (MDE) mode may be run on a smart terminal 100, such as a phone, or a smart media device 200, such as a TV.

In Operation 702, the smart media device 200 may search a network to which the smart media device 200 is connected for a smart terminal 100.

If a smart terminal 100 is found, in Operation 703, whether a virtualized container is installed on the found smart terminal 100 may be determined. If the virtualized container is not installed, in Operation 704, the virtualized container may be installed on the smart terminal 100. If the virtualized container is installed, in Operation 705 whether an APP is installed on the virtualized container may be determined. If an APP is not installed, in Operation 706, an APP may be installed on the virtualized container. If an APP is installed on the virtualized container, in Operation 707, an APP may be executed on the virtualized container. The executed APP may be one selected by a user who is interacting with the smart media device 200. The user may control a remote control of smart media device 200 to select a certain APP, an example which will be explained later with reference to FIG. 14. In Operation 708, the executed APP may be displayed on smart media device 200 and controlled on smart media device 200. In Operation 709, the APP may be changed to another APP in the virtualized container. In Operation 710, whether a user input to exit the virtualized container is received may be determined. If the user input to exit the virtualized container is received at smart media device 200 or smart terminal 100, the virtualized container may be terminated.

In embodiment of the disclosure, a smart terminal may set a plurality of virtualized containers. Each virtualized container may provide an independent APP runtime environment. Besides, each virtualized container may be discovered by a smart media device in the same LAN, or in the same network, and may provide contents for a plurality of smart media devices. The plurality of virtualized containers set by the smart terminal may be run independently in the background, which does not affect a user to use the smart terminal, such that the smart terminal may function as a multi-purpose machine, an example of which will be explained later with reference to FIG. 13 However, current screen of a foreground of the smart terminal may be not shared, and thus privacy of its owner may be protected.

Embodiments of the disclosure will be described in the following, accompanying with several specific examples.

Figure 8:
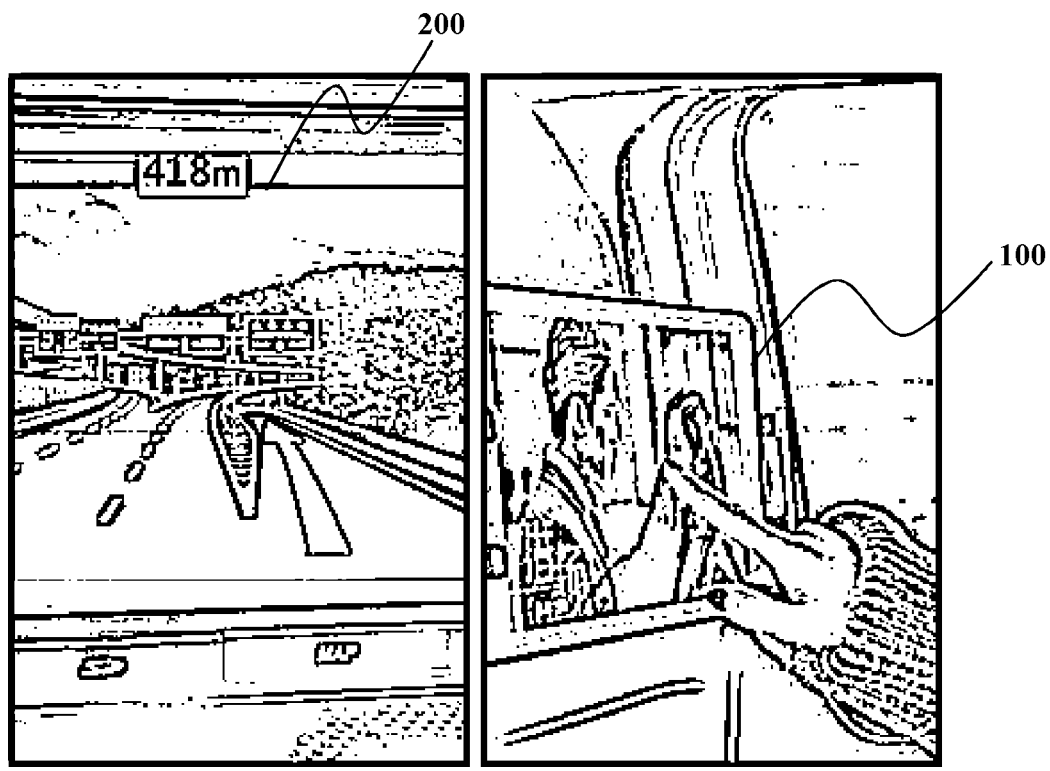
FIG. 8 is a schematic diagram for explaining running of a background of a virtualized container service according to an embodiment.

FIG. 8 is a schematic diagram for explaining running of a background of a virtualized container service in accordance with an embodiment of the disclosure.

In an example, it may be not convenient for a driver to open a navigation app while driving on a highway. Thus, a another person may project contents related to a navigation APP in a virtualization container of a smart terminal 100 thereof to a smart media device 200, which may be a control screen in a car of the driver.

After projecting the navigation APP related contents by the virtualization container in the smart terminal 100 of the other person, the virtualization container of the smart terminal 100 of the other person may be run in the background, thus, other programs of the smart terminal may be still run on the foreground, e.g., playing audio or video on the smart terminal 100.

Figure 9:
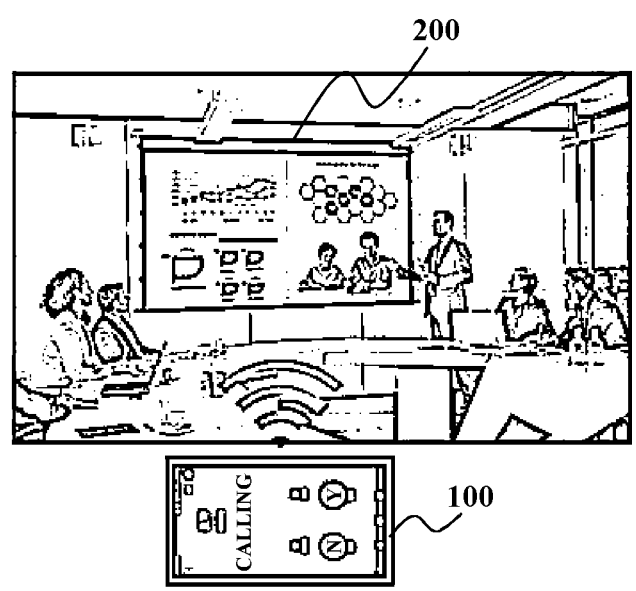
FIG. 9 is a schematic diagram for explaining protection of privacy by a virtualized container service according to an embodiment.

FIG. 9 is a schematic diagram for explaining protection of privacy by a virtualized container service in accordance with an embodiment of the disclosure.

In an example, meeting materials may be saved in a virtualized container of a smart terminal 100. The meeting materials may be projected onto a large screen of a smart media device 200 via the virtualized container. During the meeting, an incoming call or message of the smart terminal 100 may not be projected onto the large screen of the smart media device 200, thereby protecting the privacy of a user of the smart terminal 100.

Figure 10:
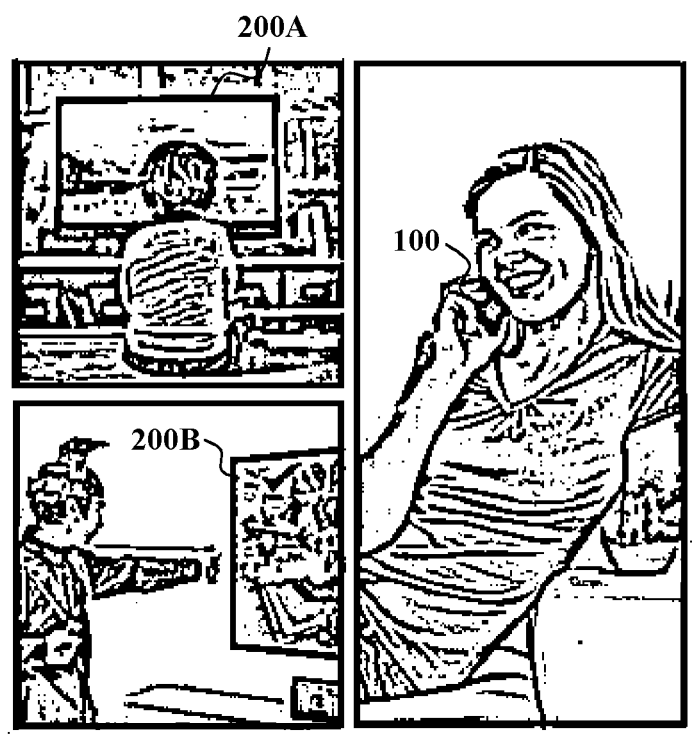
FIG. 10 is a schematic diagram for explaining multiple tasks and content control of TVs according to an embodiment.

FIG. 10 is a schematic diagram for explaining multiple tasks and content control of TVs in accordance with an embodiment of the disclosure.

In an example, a child at home may want to watch cartoons. A parent may start a virtualized container of a smart terminal 100, and project a cartoon APP onto a smart media device 200A, which may be for example a TV to be viewed by the child. The child may select favorite APPs and video contents, by using a remote control of the smart media device 200A, without the need for the parent to control the smart terminal 100.

Another child at home may want to play games. The parent may start another virtualized container of the smart terminal 100, run a game APP, and then project onto another smart media device 200B, which may be another TV for another child to play game.

The parent may still use her smart terminal 100 to call a friend without any interference with each other.

From embodiments of the disclosure, it can be seen that, in embodiment of the disclosure, an interactive system of a smart media device and a smart terminal is implemented by a virtualized container. The system may support background running of an APP, provide privacy for a user of the smart terminal, and meanwhile support multiple tasks. However, the smart terminal may be a main controller. It may be convenient to manipulate APPs in the smart terminal.

Figure 11:
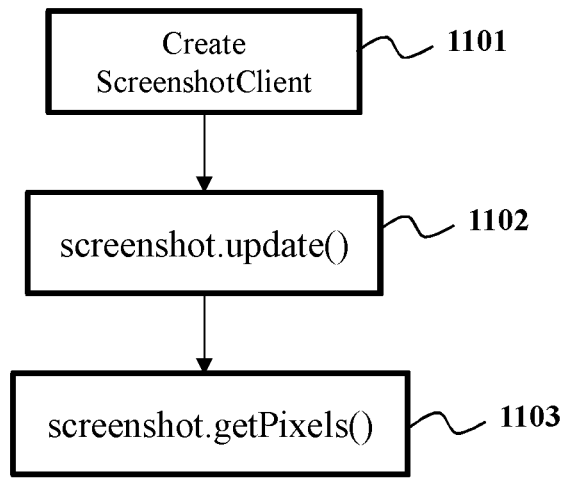
FIG. 11 is a flowchart of a method for generating a video stream according to an embodiment.

FIG. 11 is a flowchart of a method for generating a video stream according to an embodiment.

Figure 12:
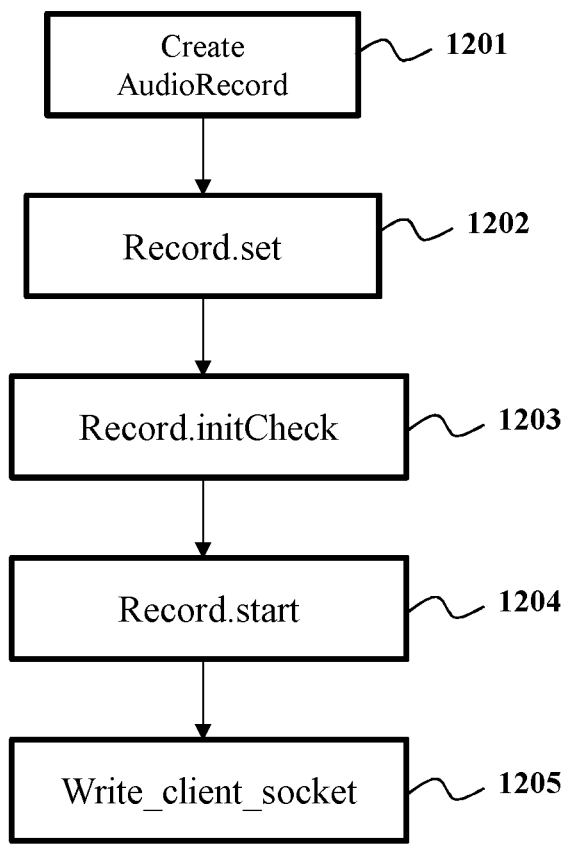
FIG. 12 is a flowchart of a method for generating an audio stream according to an embodiment.

FIG. 12 is a flowchart of a method for generating an audio stream according to an embodiment.

Setting the virtualized container in the smart terminal may be supported by: virtualized container setup function, Virtual Desktop Infrastructure (VDI) service function, Remote Procedure Call (RPC) service function.

In an embodiment, the VDI server function may be configured to transmit contents of an APP, which is running in the virtualized container, to the smart media device.

In Operation 1101, the VDI server function may call an Application Programming Interface (API) in the smart terminal, for example Create ScreenshotClient, to capture contents of an APP, which is running on the virtualized container, for example, capturing screen picture data, capturing screen methods may be achieved in various ways.

In Operation 1102, the VDI server function may call an API, for example screenshot.update( ), to update screenshots.

In Operation 1103, the VDI server function may call an API, for example screenshot.getPixels( ), to obtain screen pixels of a running APP. The VDI server function may use a video codec (e.g., X264, but not limited thereto) to encode the obtained data, so as to generate a video stream, and then transmit to the client of the virtualized container of the smart media device, by using a network streaming protocol, in which a VDI client function decodes the video stream, obtains and plays video data.

In an embodiment, after encoding and compressing the contents of the executed APP, the compressed and encoded contents may be transmitted to the client of the virtualized container, by using the established network streaming protocol.

In Operation 1201, the VDI server calls an API, for example Create AudioRecord, of pulseaudio to capture audio date of an APP running in the virtualized container.

In Operation 1202, Record.set may register a callback function to obtain the audio data In Operation 1203 Record.initCheck may be called to check initial, and then, recording may be started using Record.start in Operation 1204. In Operation 1205 the callback may write the audio data to the client audio socket using Write_client_socket when a client audio socket (in a VDI client) is connected thereto. That is, an audio stream may be transmitted.

Figure 13:
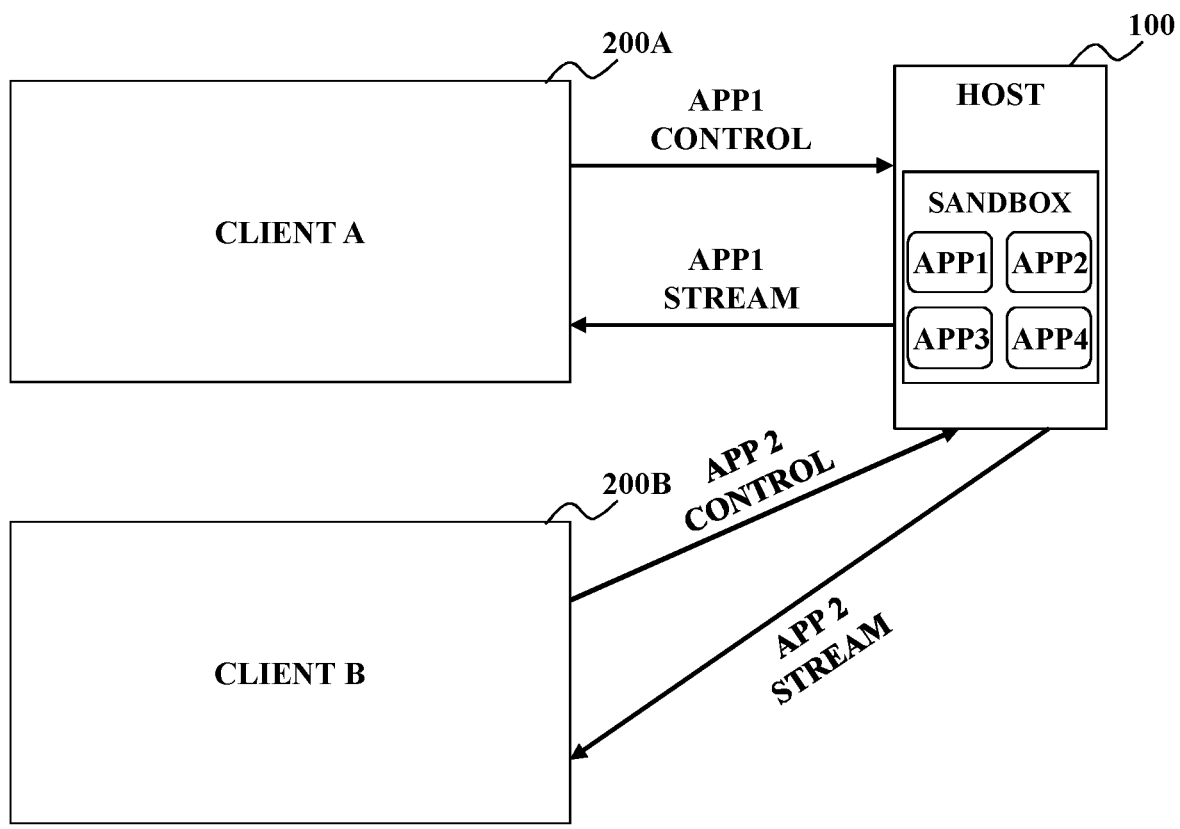
FIG. 13 is a diagram for explaining a scenario where one host is connected to two or more clients according to an embodiment.

FIG. 13 is a diagram for explaining a scenario where one host is connected to two or more clients according to an embodiment.

In an embodiment, two client smart media devices 200A and 200B may be clients of a virtualized container of a host smart terminal 100. In an embodiment, two client smart media devices 200A and 200B may be clients of two virtualized container of the host smart terminal 100. The two virtualized container of the host smart terminal 100 may be run independently with each other. Therefore, a client smart media device 200A may use the host to run APP1 while a client smart media device 200B may use the host to run APP2, while APP3 and APP4 also run independently in a sandbox of the smart terminal 100.

Figure 14:
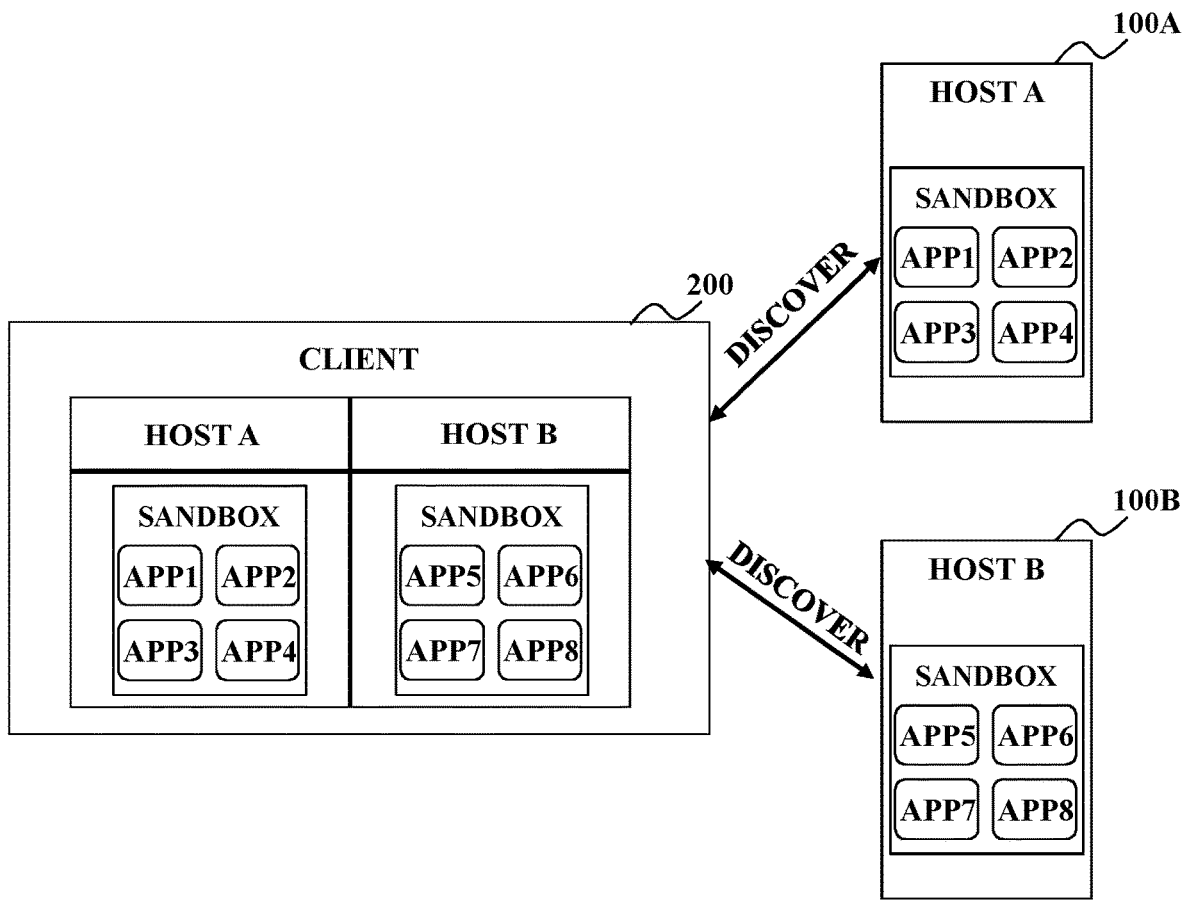
FIG. 14 is a diagram for explaining a scenario where one client is connected to two or more hosts according to an embodiment.

FIG. 14 is a diagram for explaining a scenario where one client is connected to two or more hosts according to an embodiment.

In an embodiment, two host smart terminals 100A and 100B may be discovered by a client smart media device 200 or connected to the client smart media device 200 with a same account. The client smart media device 200 may display graphic representations corresponding to two host smart terminals 100A and 100B. The graphic representations corresponding to two host smart terminals 100A and 100B may be tabs as shown in FIG. 14, but are not limited thereto. According to an embodiment, a user may conveniently navigate between the two host smart terminals 100A and 100B on the client smart media device 200.

In an embodiment, the client smart media device 200 may display graphic representations corresponding to APPs installed on virtualized containers of two host smart terminals 100A and 100B. For example, APPs 1-4 may be installed on a virtualized container of smart terminal 100A, and APPs 5-8 may be installed on a virtualized container of smart terminal 100B. The graphic representations corresponding to the APPs may be shortcut icons as shown in FIG. 14, but are not limited thereto. Both of shortcut icons of two host smart terminals 100A and 100B are displayed in FIG. 14, but icons of either one of host smart terminals 100A and 100B may be displayed when a corresponding tab of a host smart terminal 100A or 100B is selected. According to an embodiment, a user may conveniently execute an APP installed on a host smart terminal 100A or 100B. In an embodiment, when the same APP is installed on two host smart terminals 100A and 100B, one host which is more idle may be selected or recommended to run the same APP.

It should be understood that modules or units of an electronic device according to the above embodiments may have the functions of implementing the corresponding operations in the method described above. The function may be implemented by a hardware, or a corresponding software executed by the hardware. Each of the above modules or units may be a software and/or a hardware, and each module may be implemented separately or integrated by plurality of modules.

The electronic device may include a memory and a processor; wherein the memory stores a computer program; the processor may invoke the computer program to perform functions related to any embodiment.

A computer readable storage medium may be further provided according to an embodiment, wherein the storage medium stores computer programs, that when executed by a processor, cause a computer to perform operations related to any embodiment.

The electronic device may include a processor and a memory. The processor may be connected with the memory through for example, the bus. In an embodiment, the electronic device may further include a transceiver. It should be noted that, in an embodiment, the number of transceivers is not limited to one.

The processor may be a central processing unit (CPU), a general-purpose processor, a digital signal processor (DSP), an application-specific integrated circuit (ASIC), a field programmable gate array (FPGA) or other programmable logic device, a transistor logic device, a hardware component, or any combination thereof. It is possible to implement or carry out the various exemplary logical blocks, modules and circuits described in connection with the disclosure. The processor may also be a combination of computing functions, such as a combination of one or more microprocessors, a combination of a DSP and a microprocessor, and the like.

Bus may include a path for communicating information between the above components. The bus may be a peripheral component interconnect (PCI) bus or an extended industry standard architecture (EISA) bus, and the like. The bus may be divided into an address bus, a data bus, a control bus, and the like.

The memory may be a read only memory (ROM) or other type of static storage device that can store static information and instructions, random access memory (RAM) or other types of dynamic storage device that can store information and instructions, also may be electrically erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage media or other magnetic storage devices, or any other medium that can be used to carry or store desired program codes in the form of instructions or data structures and can be accessed by a computer, but not limited to this.

The memory may store a computer program that executes above methods, and is controlled by the processor for execution. The processor is configured to execute a computer program stored in the memory to implement the content shown in any of the foregoing method embodiments.

Moreover, it should be understood that various units according to an embodiment may be implemented as hardware components and/or software components. Those skilled in the art can implement the various units, for example, using an FPGA or an ASIC, depending on the processing performed by the various defined units.

Further, embodiments may be implemented as computer codes in a computer readable recording medium by those skilled in the art according to the disclosure. The computer codes are carried out when the computer codes are executed in a computer.

Although the disclosure has been described with various embodiments, various changes and modifications may be suggested to one skilled in the art. It is intended that the disclosure encompass such changes and modifications as fall within the scope of the appended claims.

What is claimed is:

1. An electronic device comprising:
   a memory configured to store at least one instruction; and
   at least one processor which is, by executing the at least one instruction, configured to:
   set, at the electronic device, a plurality of virtualized containers, wherein each of the plurality of virtualized containers includes one or more applications from among a plurality of applications installed in the electronic device and provides an independent application runtime environment;
   execute, at the electronic device, the one or more applications;
   transmit, from the electronic device, a plurality of contents corresponding to the one or more applications to a plurality of smart media devices;
   receive, at the electronic device, at least one control instruction from an operating system included in a smart media device from among the plurality of smart media devices; and
   control, at the electronic device, at least one application from among the plurality of applications according to the received at least one control instruction,
   wherein the plurality of virtualized containers run independently in a background of the electronic device,
   wherein a current screen of a foreground of the electronic device is excluded from sharing,
   wherein a virtualized container from among the plurality of virtualized containers is supported by a virtual desktop infrastructure (VDI) server and a remote procedure call (RPC) server running on the electronic device, and
   wherein the virtualized container is configured to process:
   a virtualized container setup function, which independently and completely provides a series of operation services.
   a VDI server function, which completes retrieval of contents related with the one or more applications in the virtualized container; and
   an RPC server function, which is in charge of applying the at least one control instruction to the at least one application loaded by the virtualized container.

2. The electronic device of claim 1, wherein the at least one processor is further configured to:
   generate a series of screenshots of the at least one application;
   encode the series of screenshots using a video codec to generate a video stream; and
   transmit the video stream to the plurality of smart media devices.

3. The electronic device of claim 1, wherein the at least one processor is further configured to:
   record audio of the at least one application to generate an audio stream; and
   transmit the audio stream to the plurality of smart media devices.

4. The electronic device of claim 1, wherein each of the plurality of virtualized containers are supported by the VDI server and the RPC server running on the electronic device, and
   wherein the VDI server is configured to transmit the plurality of contents to the plurality of smart media devices, and the RPC server is configured to receive the at least one control instruction from the plurality of smart media devices.

5. A method performed at an electronic device, comprising:
   setting, on the electronic device, a plurality of virtualized containers, wherein each of the plurality of virtualized containers includes one or more applications from among a plurality of applications installed in the electronic device and provides an independent application runtime environment;
   executing, at the electronic device, the one or more applications;
   transmitting, from the electronic device, a plurality of contents corresponding to the one or more applications to a plurality of smart media devices;
   receiving, at the electronic device, at least one control instruction from an operating system included in a smart media device from among the plurality of smart media devices; and
   controlling, at the electronic device, at least one application from among the plurality of applications according to the received at least one control instruction,
   wherein the plurality of virtualized containers run independently in a background of the electronic device,
   wherein a current screen of a foreground of the electronic device is excluded from sharing, wherein a virtualized container from among the plurality of virtualized containers is supported by a virtual desktop infrastructure (VDI) server and a remote procedure call (RPC) server running on the electronic device, and wherein the virtualized container is configured to process:
a virtualized container setup function, which independently and completely provides a series of operation services.
a VDI server function, which completes retrieval of contents related with the one or more applications in the virtualized container; and
an RPC server function, which is in charge of applying the at least one control instruction to the at least one application loaded by the virtualized container.

6. A non-transitory computer-readable medium having instructions recorded thereon which, when executed by at least one processor, cause the at least one processor to:
set, on an electronic device, a plurality of virtualized containers, wherein each of the plurality of virtualized containers includes one or more applications from among a plurality of applications installed in the electronic device and provides an independent application runtime environment;
execute, at the electronic device, the one or more applications;
transmitting, from the electronic device, a plurality of contents corresponding to the one or more applications to a plurality of smart media devices;
receive, at the electronic device, at least one control instruction from an operating system included in a smart media device from among the plurality of smart media devices; and
control, at the electronic device, at least one application from among the plurality of applications according to the received at least one control instruction,
wherein the plurality of virtualized containers run independently in a background of the electronic device,
wherein a current screen of a foreground of the electronic device is excluded from sharing,
wherein a virtualized container from among the plurality of virtualized containers is supported by a virtual desktop infrastructure (VDI) server and a remote procedure call (RPC) server running on the electronic device, and
wherein the virtualized container is configured to process:
a virtualized container setup function, which independently and completely provides a series of operation services;
a VDI server function, which completes retrieval of contents related with the one or more applications in the virtualized container; and
an RPC server function, which is in charge of applying the at least one control instruction to the at least one application loaded by the virtualized container.

* * * * *